(No Model.)

B. H. HADLEY.
SURFACE GRINDING TABLE FOR EMERY WHEELS.

No. 280,033. Patented June 26, 1883.

WITNESSES:
Charles Hannigan
Willis H. Keath

INVENTOR:
Benjamin H. Hadley

UNITED STATES PATENT OFFICE.

BENJAMIN H. HADLEY, OF PROVIDENCE, RHODE ISLAND.

SURFACE-GRINDING TABLE FOR EMERY-WHEELS.

SPECIFICATION forming part of Letters Patent No. 280,033, dated June 26, 1883.

Application filed March 29, 1883. (No model.)

*To all whom it may concern:*

Be it known that I, BENJAMIN H. HADLEY, of Providence, in the State of Rhode Island, have invented an Improvement in Surface-Grinding Tables for Emery-Wheels, of which the following is a specification.

The nature of my invention consists in the combination of a pivoted table with the supporting-stand of an emery-wheel in such a manner that the table may be moved away from the emery-wheel without removal or detachment from the supporting-stand.

It also consists in a surface-grinding table provided with an adjustable opening for the emery-wheel, whereby the table may be readily made to fit wheels of different thickness.

Figure 1:
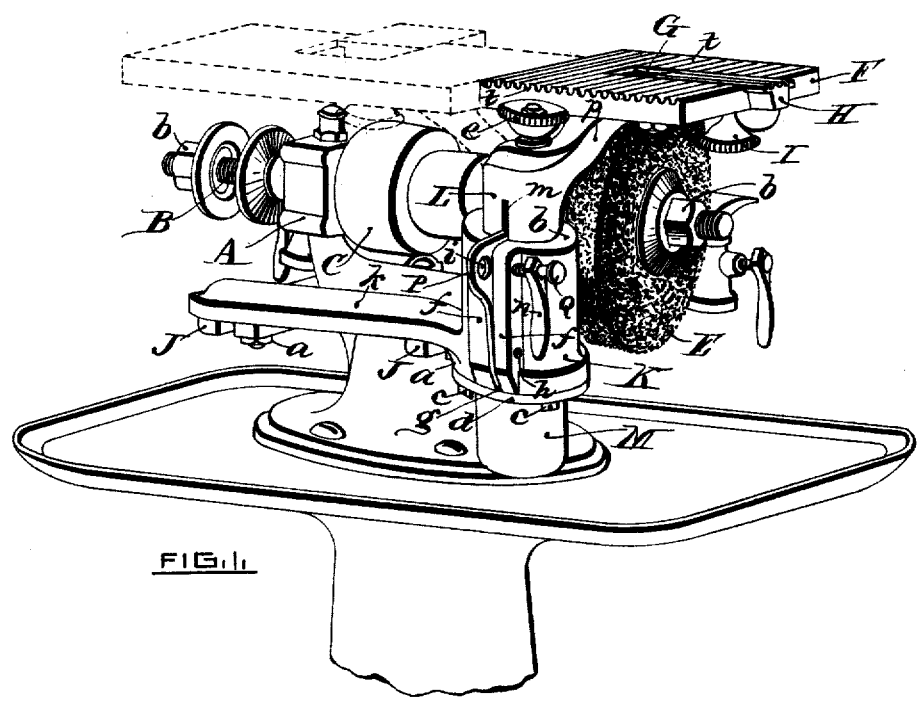
Figure 2:
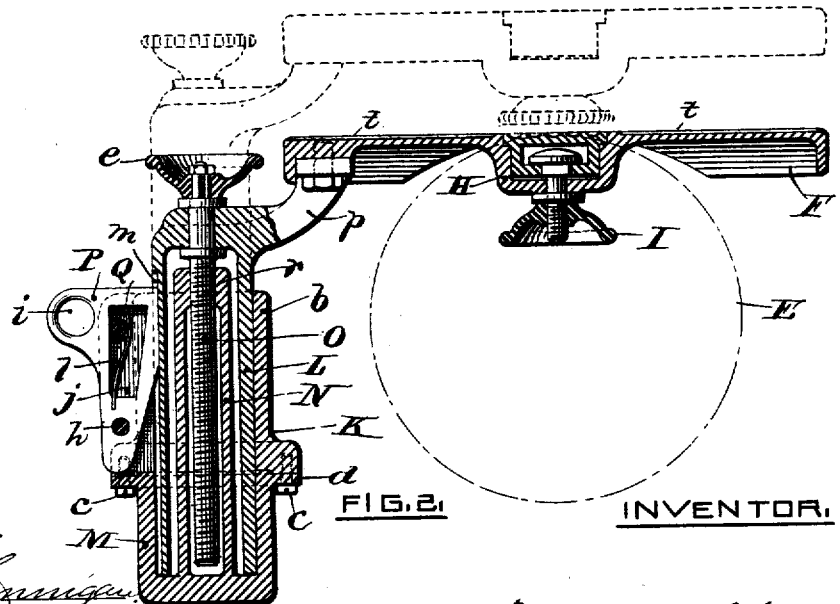

Figure 1 is a perspective view of an emery grinder provided with my improvement. Fig. 2 is a vertical section of the table and its pivot-standard.

In the accompanying drawings, A is the frame of an emery grinder.

B is the shaft, upon the ends of which the emery-wheels are to be secured by means of the nuts *b*. C is the driving-pulley, and E the emery-wheel.

The surface-grinding table F is provided with an opening, G, extending to the edge of the table, and adapted to receive the sliding piece H, which is held in proper position, adjacent to the side of the emery-wheel E by means of the screw I.

To the slotted rest-supporting arms J J, at the side of the frame A, is attached the table-holder K by means of the bolts *a a*, the heads of which are held in a groove made in the base *k* of the holder. The hub *b* of the holder is bored out to receive the hollow pivot-standard L of the table, and to the lower side of the holder K, and in line with the axis of the hub *b*, is secured the step M by means of the screws *c c*, passing through the flange *d* of the step. The chambered standard N, which is made in one piece with the step M, is provided at its upper end with the screw thread or nut *r*, adapted to receive the screw O, which is journaled at the upper end of the pivot-standard, and also provided with the milled head *e*.

The hub of the holder K is slotted entirely through in a vertical direction between the two ears *f f*, and in the slot *g* between the two ears *f f* is pivoted the pawl P by means of the pivot-screw *h*.

The pawl P is provided with a perforation, *i*, adapted to receive the finger of the operator, and is also perforated at *j*, to form a chamber adapted for the spring *l*, which, by bearing against the clamp-screw, serves to press the pawl into the longitudinal groove *m*, made in the pivot-standard, thus preventing the table from turning on its pivot. The screw Q serves to clamp the sides of the split hub *b* upon the pivot-standard, to hold the table F firmly in position, and the screw Q is operated for this purpose by means of the wrench *n*. The table F is secured to the arm *p*, which curves upward at one side of the standard, and is provided with the grooves *t t* upon its surface, in order to provide recesses for the reception of grinding-dust and emery from the wheel, in order that the piece of work may be made to seat properly upon the table.

Heretofore in surface-grinding tables for emery-wheels the table has been so constructed and arranged that in order to use the wheel for other purposes it was necessary to remove the table entirely from the frame; but by my improvement I have simply to unclamp the pivot-standard and raise the table clear of the wheel, as shown in dotted lines, Fig. 2, by turning the screw O; then by inserting the finger in the perforation *i* of the pawl P, and pulling the pawl backward against the action of the spring *l*, thus bringing the pawl out of the groove *m* of the pivot-standard, the table may be turned upon its pivot to any desired position away from the emery-wheel, after which the wheel may be used for any other purpose desired, and the removal of the table and return of the same may be effected with ease and celerity.

I claim as my invention—

1. The combination of the emery-wheel E, surface-grinding table F, pivot-standard L, screw O, holder K, and nut *r*, whereby the table F may be raised by means of the screw and rotated upon the axis of the pivot-standard, substantially as described.

2. The combination of the surface-grinding table for emery-wheels with the adjustable sliding piece for adapting the table to wheels of varying thickness, substantially as described.

3. The combination of the wheel E, table F, pivot-standard L, provided with a groove, $m$, screw O, nut $r$, pawl P, holder K, provided with a split hub, $b$, and clamping-screw Q, substantially as described.

BENJAMIN H. HADLEY.

Witnesses:
 DEXTER B. POTTER,
 SOCRATES SCHOLFIELD.